United States Patent [19]

Kern et al.

[11] Patent Number: 5,670,108
[45] Date of Patent: Sep. 23, 1997

[54] METHOD OF MOLDING A PLASTIC VESSEL HAVING A FLASH TRAP

[75] Inventors: John Alan Kern; Jerry A. Eurich, both of Saginaw, Mich.

[73] Assignee: General Motors Corporation, Detroit, Mich.

[21] Appl. No.: 552,589

[22] Filed: Nov. 3, 1995

[51] Int. Cl.⁶ ............................................. B29C 65/00
[52] U.S. Cl. ........................... 264/248; 156/292; 220/613
[58] Field of Search ............................... 264/248, 445; 156/73.1, 292; 220/612, 613, 617, 618, 621

[56] References Cited

U.S. PATENT DOCUMENTS

| | | | |
|---|---|---|---|
| 3,432,072 | 3/1969 | Quercia | 220/617 X |
| 3,562,078 | 2/1971 | Zumstein | 264/445 X |
| 3,706,393 | 12/1972 | Curtis et al. | 220/613 |
| 4,353,761 | 10/1982 | Woerz et al. | 264/248 X |
| 4,601,927 | 7/1986 | Durfee | 264/248 X |
| 4,663,206 | 5/1987 | Bouyoucos et al. | 264/248 X |
| 4,670,207 | 6/1987 | Yamada et al. | 264/248 |
| 4,886,181 | 12/1989 | Haines | 220/613 X |
| 5,049,274 | 9/1991 | Leason et al. | 156/73.1 X |
| 5,263,606 | 11/1993 | Dutt et al. | 220/613 |

*Primary Examiner*—Jan H. Silbaugh
*Assistant Examiner*—Mark Eashoo
*Attorney, Agent, or Firm*—Charles E. Leahy

[57] ABSTRACT

A molded plastic vessel is made by hot plate welding together of weld bosses provided respectively on mating rim portions of first and second vessel forming component parts. The first molded part has a weld boss and a shroud which is located radially inboard of the weld boss and projects toward the second part. The second part has a weld boss axially aligned with the weld boss of the first part for mating thereto, and a shroud projecting toward the first part and spaced radially inboard of the shroud of the first part. Upon hot plate melting of weld bosses and the subsequent pressing together of the first and second parts, the shroud of the first part engages and pushes the melt flash projecting inboard of the weld boss of the first part into the space between the weld boss and shroud of the second part to thereby divert the melt flash from overflowing into the interior of the vessel.

1 Claim, 2 Drawing Sheets

METHOD OF MOLDING A PLASTIC VESSEL HAVING A FLASH TRAP

The invention relates to a vessel formed by hot plate welding together of a pair of plastic parts and, more particularly provides shrouds adjacent the weld bosses which function to trap hot melt flash material which might otherwise overflow into the interior of the vessel.

BACKGROUND OF THE INVENTION

It is well known to form a closed fluid vessel by injection molding a pair of vessel half parts having rims thereon for mating together, heating weld bosses provided on the rims on a hot plate to melt the weld bosses, and then pressing the part together so that the rims become welded and sealed together. It is well known that the heating of the plastic and pressing together of the parts will cause some of the melted plastic material to be squeezed laterally of the melted face or the plastic part and, upon cooling, for a bead or flash.

Depending on the type of plastic being used, the degree of heating, and the force with which the parts are pressed together, there may be a tendency for the hot melted flash material to overflow into the interior of the reservoir.

SUMMARY OF THE INVENTION

The present invention provides a new and improved rim portion for a vessel in which the weld bosses have associated interfitting shroud structures to trap the melted plastic flash material from flowing into the interior of the vessel. According to the invention, a molded plastic vessel is made by hot plate welding together of weld bosses provided respectively on the mating rim portions of the first and second component parts forming the vessel. The first molded part has a weld boss and a shroud which is located radially inboard of the weld boss and projects toward the second part. The second part has a weld boss axially aligned with the weld boss of the first part for mating thereto, and a shroud projecting toward the first part and spaced radially inboard of the shroud of the first part. Upon hot plate melting of weld bosses and the subsequent pressing together of the first and second parts, the shroud of the first part engages and pushes the melt flash projecting inboard of the weld boss of the first part into the space between the weld boss and shroud of the second part to thereby divert the melt flash from overflowing into the interior of the vessel. The interior wall of the first part is molded to provide a draft angle which facilitates removal of the first part from its mold and also causes the shroud of the second part to progressively approach into a close fitting relationship with the interior wall of the first part as the parts are pressed together. This closes off the space between the weld boss and the shroud of the second part to further block any melt flash which may have flowed over the shroud of the first part and prevent flowing of the flash into the interior of the vessel.

BRIEF DESCRIPTION OF THE DRAWINGS

These and other objects, features and advantages of the invention will become apparent upon consideration of the description of the preferred embodiment and appended drawings in which.

DESCRIPTION OF THE PREFERRED EMBODIMENT

Figure 1:
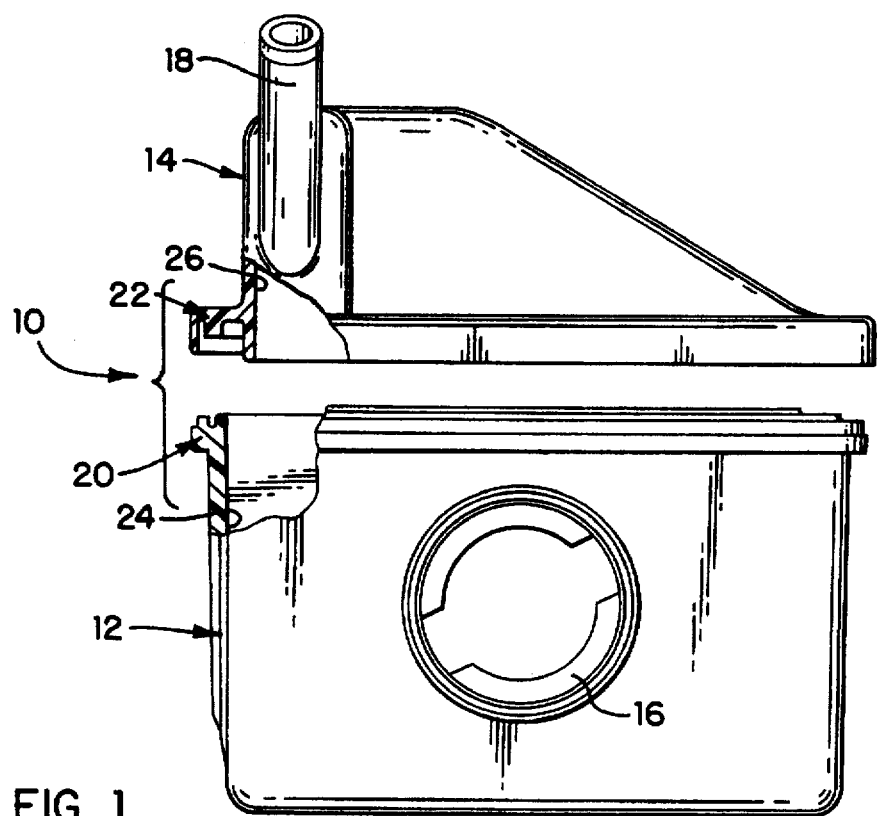
FIG. 1 is a elevation view of first and second molded component parts, having part broken away and in section which will be joined together to form the vessel.

Referring to FIG. 1, it will be seen that a vessel 10 for storing a liquid will be formed by joining together a first part or body 12 and a second part or cover 14. The parts 12 and 14 are injection molded of a suitable plastic material. The first part 12 has an integral outlet 16. The second part 14 has an integral inlet 18. The first part 12 has a peripheral rim 20 which faces toward a mating peripheral rim portion 22 of the second part 14. The first part 12 has an inner wall 24 which extends at a small draft angle with respect to the axis of the first part 12 to facilitate removal of the first part 12 from the plastic mold. Likewise, the second part 14 has an inner wall 26 which is molded at a small draft angle with respect to the axis thereof.

Figure 2:
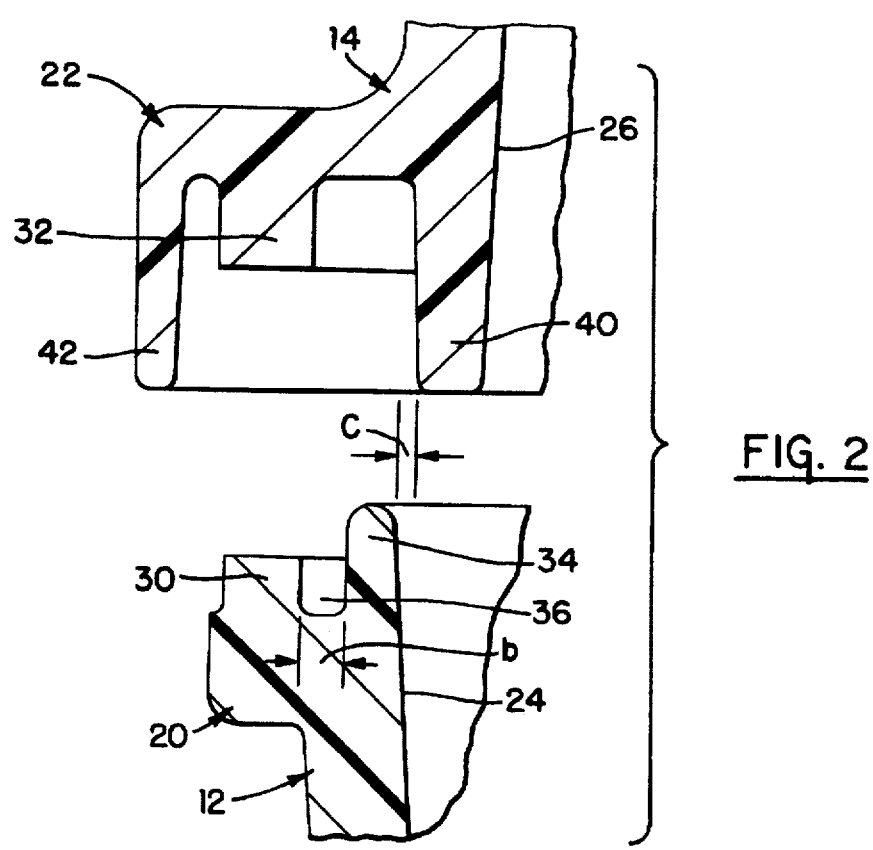
FIG. 2 is an enlarged fragmentary view of FIG. 1.

As best seen in the enlarged view of FIG. 2, the first part 12 has a weld boss 30 which faces toward a mating weld boss 32 of the second part 14. The rim 20 of the first part 12 also has an upstanding shroud 34 which is spaced radially inward of the weld boss 30 by a recess 36 having a width b. The rim 22 of the second part 14 has a first downwardly hanging shroud 40 which is spaced inwardly of the shroud 34 of first part 12 by a distance c, and a second shroud 42 which is spaced radially outward of the weld bosses 30 and 32.

Figure 3:
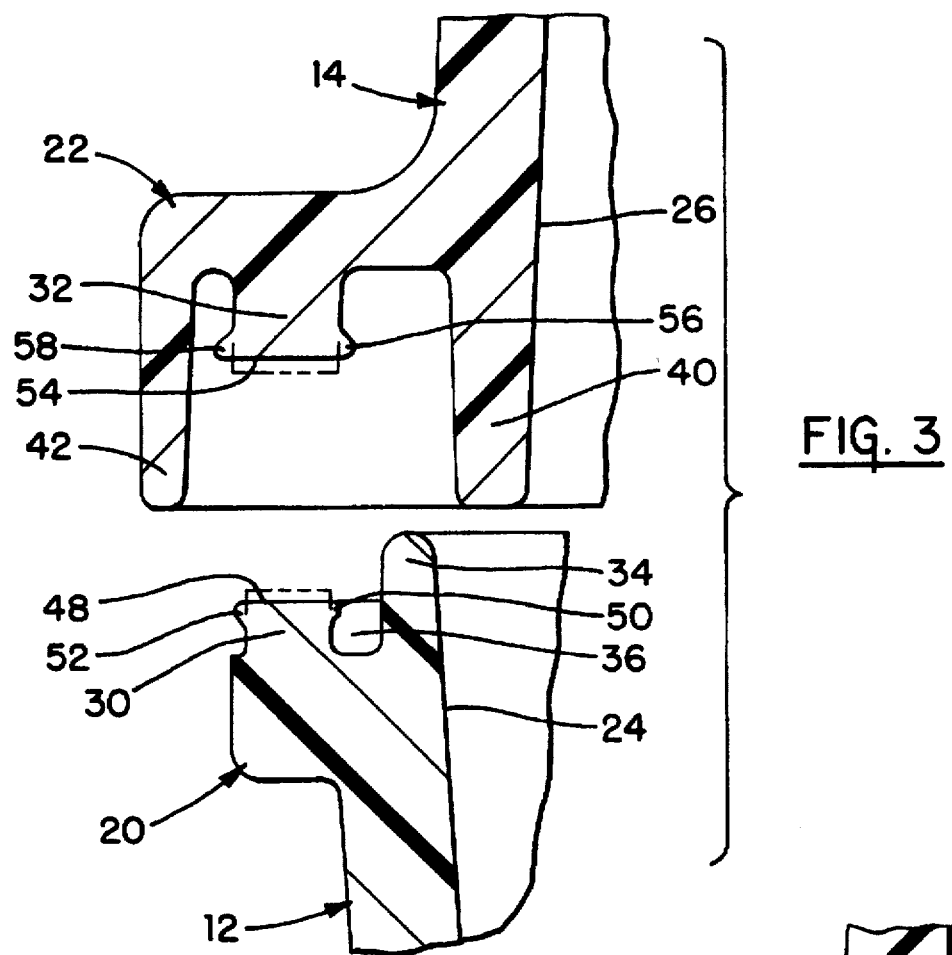
FIG. 3 is an enlarged view showing a section through the rim portions of the component parts and showing the weld bosses having been heated and deformed by pressing against a hot plate to melt the plastic bosses.

FIG. 3 shows the parts 12 and 14 after the weld bosses 30 and 32 have been pressed against a hot plate to melt the bosses. As seen in FIG. 3, this melting of the boss 30 has formed a melt face 48 including an inwardly hanging hot flash bead 50 and an outwardly hanging melt flash bead 52. Likewise, the weld boss 32 of the second part 14 has been heated and deformed to provide a hot melt face 54, inwardly hanging melt flash bead 56 and outwardly hanging melt flash bead 58.

Figure 4:
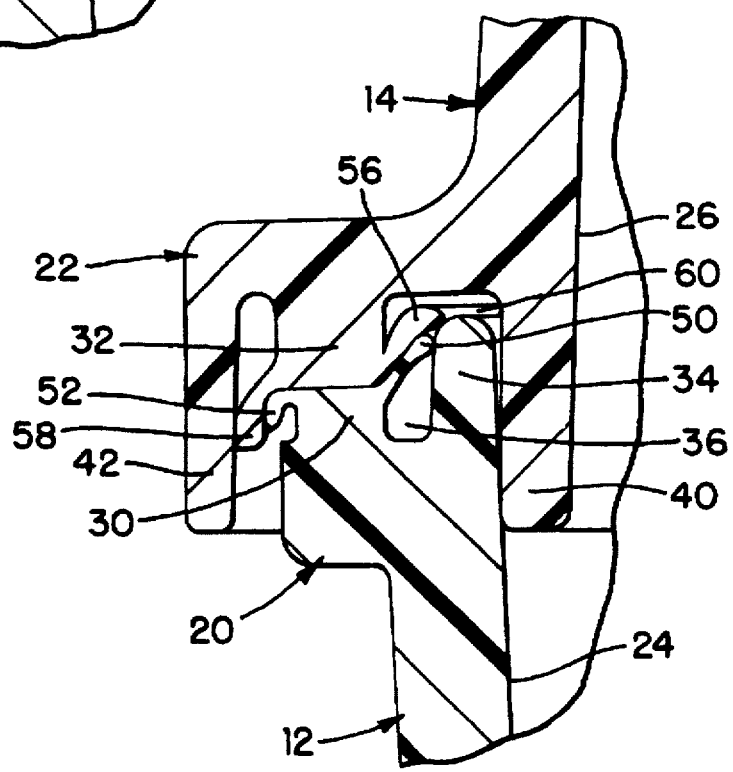
FIG. 4 shows the first and second molded parts sealed together to define the vessel.

As seen in FIG. 4, after hot plate heating and melting of the weld bosses 30 and 32 shown in FIG. 3, the parts 12 and 14 are pressed together causing the melt faces 48 and 54 to become sealed together as the pressing force causes a further displacement of plastic material and growth of the melt flash overhangs. More particularly, as seen in FIG. 4, the pressing together of the parts 12 and 14 causes the shroud 34 of the first part 12 to engage against the underside of the inwardly hanging melt flash bead 56 of second part 14 thereby causing the melt flash bead 56 which is melding into the inwardly hanging melt flash bead 50 to be pushed upwardly and away from the inside of the vessel while simultaneously causing the flash beads 56 and 50 to roll into a tight bead of melted plastic material stored within a cavity formed between the weld boss 32, shroud 34 and shroud 40. Thus, as the weld cools, the roll of material consolidates and solidifies to control the flash against forming a thin weld section which may be subject to fragmentation.

Furthermore, as seen in FIG. 3, the progressive pressing together of the first part 12 and second part 14 cause the shroud 40 of the second part 14 to approach into close fitting relationship, either directly contacting or very closely spaced, with the inner wall 24 of the first part 12. This close fitting relationship between the shroud 40 and the inner wall 24 is facilitated by the draft angle of the inner wall 24 and works to close off the cavity 60 defined between the weld bosses 30 and 32 and the shroud 40 so that the weld flash beads 50 and 56 become trapped against overflowing into the interior of the vessel.

In the preferred embodiment, it will be appreciated that the shroud 34 of the first part 12 is of sufficient height of projection beyond the weld boss 30 that it will, as shown in FIG. 3, prevent the inwardly hanging flash bead 50 from reaching the interior of the vessel during the hot plate melting of the weld boss 30. However, it is also seen that this dimensional height of the shroud 34 is not so great that the shroud 34 would engage with the rim 22 of the second part 12 as such contact would limit the pressing together of the parts 12 and 14 and also limit the size of the cavity 60 in which the flash beads 50 and 56 are to be rolled and stored.

As seen in FIG. 4, the second shroud 42 of the second part 14 overhangs the outwardly hanging weld flash beads 52 and 58 to conceal these beads from view.

Thus, is seen that the invention provides a new and improved vessel which blocks and traps the overflow of hot melt flash into the interior of the vessel.

We claim:

1. In a method of molding a plastic vessel having an interior by hot plate welding together of weld bosses provided respectively on mating rim portions of first and second component parts which form the plastic vessel, the improvement comprising:

providing said first component part having a first weld boss and a first shroud located radially inboard of said first weld boss and extending peripherally around a rim portion thereof;

providing said second component part having a second weld boss, such that said second weld boss is axially aligned with said first weld boss when said first and second components are welded together, and a second shroud which projects in a substantially same direction as said second weld boss and spaced radially inboard of said first shroud when said first and second components are welded together thereby defining a cavity between said first and second weld bosses and said first and second shrouds;

melting of said first and second weld bosses with a hot plate; and subsequently welding said first and second component parts by pressing together said first and second weld bosses, wherein said first shroud engages and pushes melt flash projecting inboard of said first weld boss into said cavity thereby blocking said melt flash from overflowing into said interior of said plastic vessel.

\* \* \* \* \*